United States Patent
Takasaki et al.

(10) Patent No.: US 7,077,165 B2
(45) Date of Patent: Jul. 18, 2006

(54) DOUBLE PIPE

(75) Inventors: Hiromi Takasaki, Sano (JP);
Yoshikazu Takamatsu, Sano (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/781,528

(22) Filed: Feb. 17, 2004

(65) Prior Publication Data

US 2004/0178627 A1    Sep. 16, 2004

(30) Foreign Application Priority Data

Feb. 17, 2003  (JP)  ............ P 2003-038626
Jul. 30, 2003  (JP)  ............ P 2003-282402

(51) Int. Cl.
*F16L 55/00* (2006.01)

(52) U.S. Cl. ............ 138/108; 138/114; 138/111; 285/123.3

(58) Field of Classification Search ............ 138/108, 138/103, 114, 129, 144, 111; 285/123.3
See application file for complete search history.

(56) References Cited

U.S. PATENT DOCUMENTS

| | | | |
|---|---|---|---|
| 2,259,433 A * | 10/1941 | Kitto | 165/154 |
| 3,163,707 A * | 12/1964 | Darling | 174/47 |
| 3,227,800 A * | 1/1966 | Bondon | 174/29 |
| 3,250,420 A | 5/1966 | Kohn | 138/108 X |
| 3,750,058 A * | 7/1973 | Bankert et al. | 333/242 |
| 4,194,560 A | 3/1980 | Matsuzaki | 165/141 |
| 4,199,955 A | 4/1980 | Jonsson | 62/79 |
| 4,320,754 A * | 3/1982 | Watson et al. | 128/204.25 |
| 4,336,798 A * | 6/1982 | Beran | 128/200.14 |
| 4,838,258 A * | 6/1989 | Dryden et al. | 128/204.18 |
| 6,009,908 A | 1/2000 | Hartnagel et al. | 138/113 |
| 6,131,615 A | 10/2000 | Hartnagel et al. | 138/113 |
| 6,145,545 A | 11/2000 | Hartnagel et al. | 138/113 |
| 6,323,420 B1 | 11/2001 | Head | 138/103 X |

FOREIGN PATENT DOCUMENTS

| | | |
|---|---|---|
| DE | 144 701 | 11/1903 |
| DE | 2 320 125 | 10/1974 |
| DE | 2 311 688 | 12/1974 |
| JP | 2001-341027 | 12/2001 |
| JP | 2002-228072 | 8/2002 |
| WO | WO 01/02767 A1 | 1/2001 |

\* cited by examiner

*Primary Examiner*—Patrick Brinson
(74) *Attorney, Agent, or Firm*—Kilpatrick Stockton LLP

(57) ABSTRACT

A double pipe has an outer pipe and an inner pipe that is formed in a spiral or wavy configuration and is held by an inner circumferential face of the outer pipe.

4 Claims, 11 Drawing Sheets

DOUBLE PIPE

CROSS REFERENCE TO RELATED APPLICATIONS

This application is based upon and claims the benefit of priority from the prior Japanese Patent Applications No. 2003-038626 filed on Feb. 17, 2003 and No. 2003-282402 filed on Jul. 30, 2003; the entire contents of which are incorporated herein by reference.

BACKGROUND OF THE INVENTION

1. Field of the Invention

The present invention relates to a double pipe and a method of manufacturing the same.

2. Description of Related Art

Piping for circulating, for example, coolant employs, among others, a double pipe composed of an outer pipe and an inner pipe arranged in the outer pipe to form dual passages.

Employing the double pipe makes a piping layout simpler and more compact, and therefore, is advantageous for a piping layout with many restrictions. In particular, a double pipe is highly advantageous for a vehicle air conditioner where a piping layout is greatly limited due to vehicle structure. Employing the double pipe is also advantageous in simplifying air-conditioner assembling work and reducing manufacturing cost.

A conventional double pipe is disclosed in, for example, Japanese Unexamined Patent Application Publication No. 2001-341027 that arranges connecting ribs between an outer pipe and an inner pipe of the double pipe. The double pipe with the connecting ribs is usually produced by extruding or drawing an aluminum material through dies.

The extruding or drawing process to form the double pipe having the connecting ribs requires complicated metal dies. In addition, the double pipe with the connecting ribs involves a cutting process of the connecting ribs when terminating ends of the double pipe. These necessities increase the manufacturing cost of the double pipe.

SUMMARY OF THE INVENTION

An object of the present invention is to provide a low-cost double pipe.

In order to accomplish the object, an aspect of the present invention provides a double pipe including an outer pipe and an inner pipe that is spirally formed and is held by an inner circumferential face of the outer pipe.

In order to accomplish the object, another aspect of the present invention provides a double pipe including an outer pipe and a wavy inner pipe that is held by an inner circumferential face of the outer pipe.

BRIEF DESCRIPTION OF THE DRAWINGS

FIGS. 1A and 1B are explanatory views showing a double pipe and a method of manufacturing the same according to a first embodiment of the present invention, in which

FIGS. 8A, 8B, and 8C are views explaining a method of manufacturing spiral inner pipes, in which

FIGS. 14A, 14B, and 14C are views explaining a method of manufacturing a double pipe according to a third embodiment, in which

DETAILED DESCRIPTION OF THE INVENTION

Embodiments of the present invention will be explained with reference to the accompanying drawings.

Figure 1A:
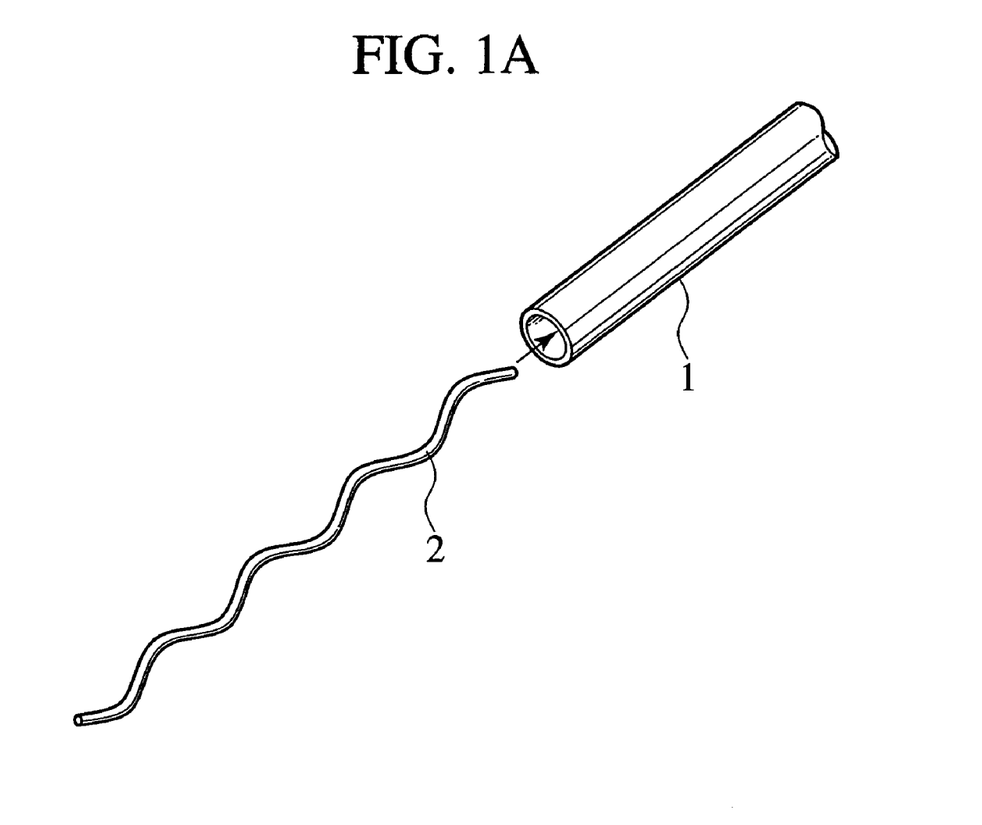
FIG. 1A shows a state to insert a spiral inner pipe into an outer pipe and FIG. 1B shows a state to curve the outer pipe with the inserted inner pipe so as to fix the outer and inner pipes to each other.
Figure 1B:
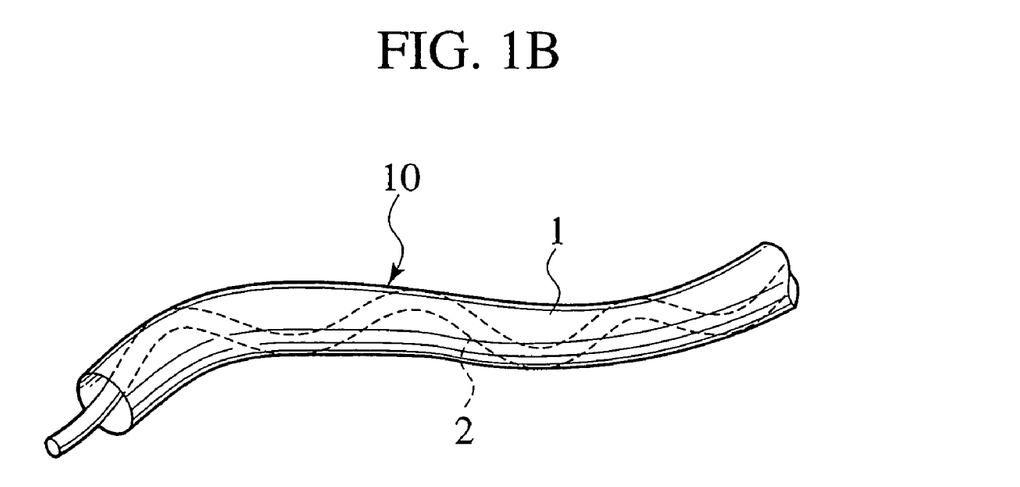

FIGS. 1A and 1B show a double pipe and a method of manufacturing the same according to the first embodiment of the present invention. The double pipe 10 comprises an outer pipe 1 and an inner pipe 2 that are independent of each other. The outer pipe 1 passes a first fluid therethrough and the inner pipe 2 passes a second fluid therethrough. The inner pipe 2 is spirally formed and is held in the outer pipe 1. There are no connecting ribs to keep a constant gap between the outer pipe 1 and the inner pipe 2.

A method of manufacturing the double pipe 10 will be explained. In FIG. 1A, the independent inner pipe 2 having a small diameter is spirally formed. At this time, the outer diameter of the spiral of the inner pipe 2 is set to be equal to or slightly smaller than the inner diameter of the outer pipe 1. Then, the spiral inner pipe 2 is inserted into the larger outer pipe 1 that is independent of the inner pipe 2. Then, the outer pipe 1 is curved into a predetermined shape according to a piping layout as shown in FIG. 1B, so that each curved part of the outer pipe 1 may press the inner pipe 2 against an inner wall of the outer pipe 1. This results in joining the inner pipe 2 with the outer pipe 1.

Figure 2A:
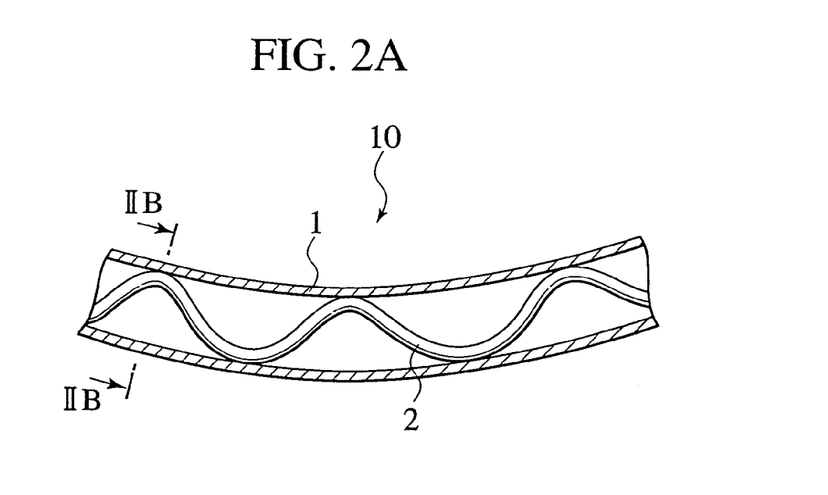
FIG. 2A is a sectional view showing a curved part of the outer and inner pipes of FIG. 1B.
Figure 2B:
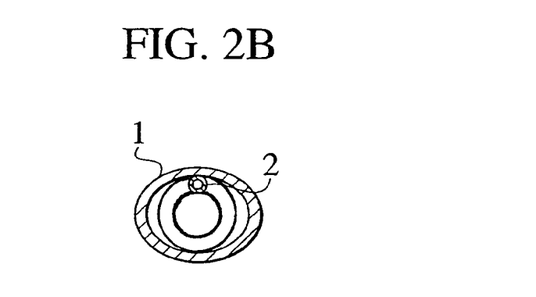
FIG. 2B is a sectional view along line IIB—IIB of FIG. 2A.

As shown in FIGS. 2A and 2B, even at a gently curved part of the outer pipe 1, the outer pipe 1 is flattened or reduced so as to strongly hold or grip the inner pipe 2.

Effects of this embodiment will be explained.

The double pipe 10 is a combination of the outer pipe 1 and inner pipe 2 that are independent of each other. Accordingly, unlike the conventional double pipe employing connecting ribs, the double pipe 10 needs no complicated extrusion dies. Without the connecting ribs, the double pipe 10 involves a simple termination process, to thereby reduce manufacturing cost.

The first embodiment inserts the spiral inner pipe 2 into the outer pipe 1 and bends the outer pipe 1 according to a piping layout to strongly press and hold the outer pipe 1 and inner pipe 2 against each other. This simplifies the manufacturing of the double pipe 10.

When inserting the spiral inner pipe 2 into the outer pipe 1, there is a gap between the outer pipe 1 and the inner pipe 2, and therefore, no excessive force is needed for the insertion of the inner pipe.

According to the embodiment, the outer pipe 1 and inner pipe 2 press against each other even at locations where the outer pipe 1 is gently curved, and therefore, the inner pipe 2 is firmly secured by the outer pipe 1 even when the double pipe 10 is installed in a vibrating body, such as a vehicle.

Compared with a straight inner pipe, the spiral inner pipe 2 has higher rigidity, and therefore, does not easily vibrate and is suitable for vehicle mounting applications.

The outer pipe 1 and spiral inner pipe 2 may be pressed against each other in other ways. FIGS. 3 to 6 show alterations to locally or wholly deform the outer pipe 1 toward the inner pipe 2, to join the outer pipe 1 and inner pipe 2 together.

Figure 3:
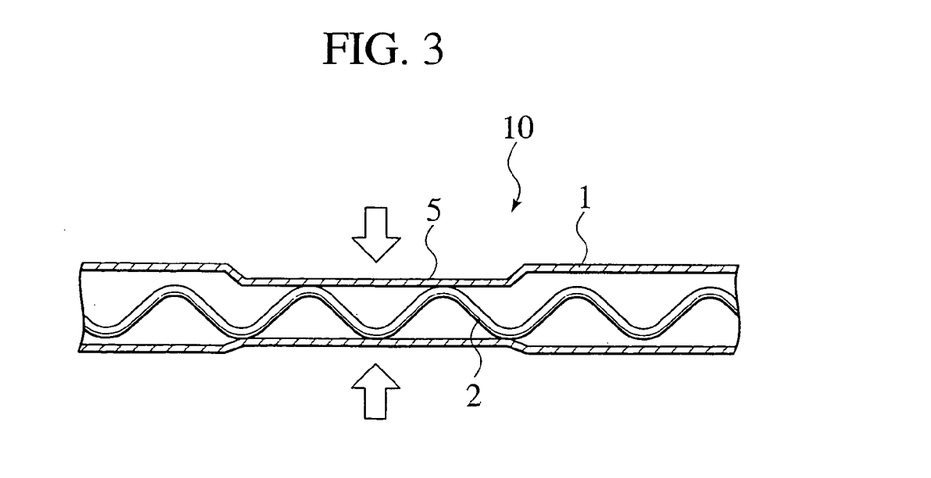
FIG. 3 is a sectional view showing an outer pipe partly crushed according to an alteration of the first embodiment.

In FIG. 3, a part of the wall of the outer pipe 1 is crushed to form a flattened cross-section, to fix the outer pipe 1 and inner pipe 2 to each other. Reference numeral 5 indicates the crushed part.

Figure 4:
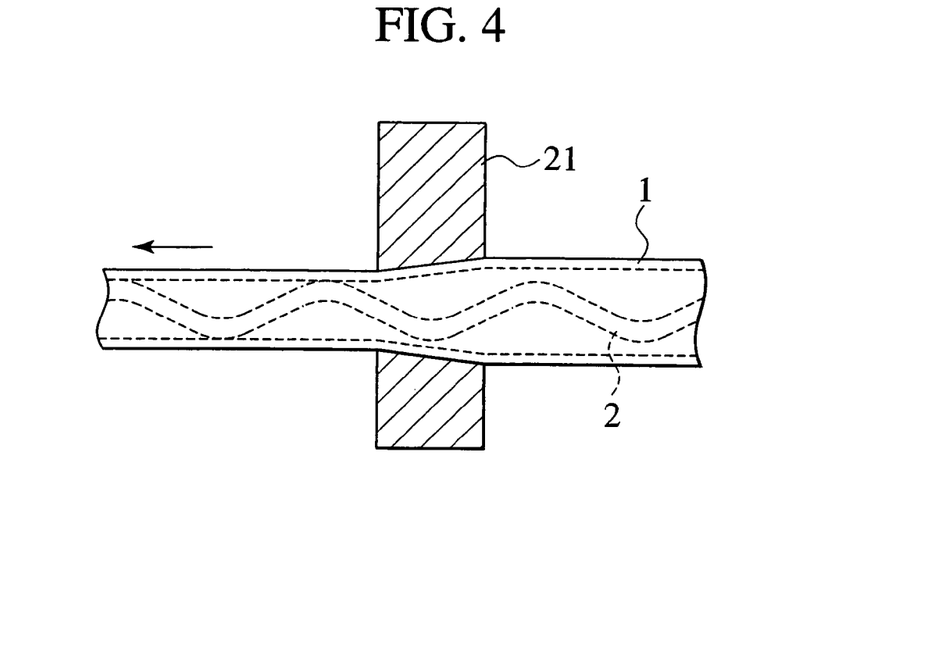
FIG. 4 is a view showing a state to iron an outer pipe with an ironing tool so as to fix the outer pipe to a spiral inner pipe inserted in the outer pipe according to an alteration of the first embodiment.

In FIG. 4, the outer pipe 1 is ironed to form a reduced diameter so that the outer pipe 1 may strongly press against the inner pipe 2 at the reduced part. More precisely, the outer pipe 1 is drawn through an ironing tool 21 in the direction of the arrow to reduce the diameter of the outer pipe 1 so that the outer pipe 1 and inner pipe 2 are fixed to each other at the reduced part.

Figure 5:
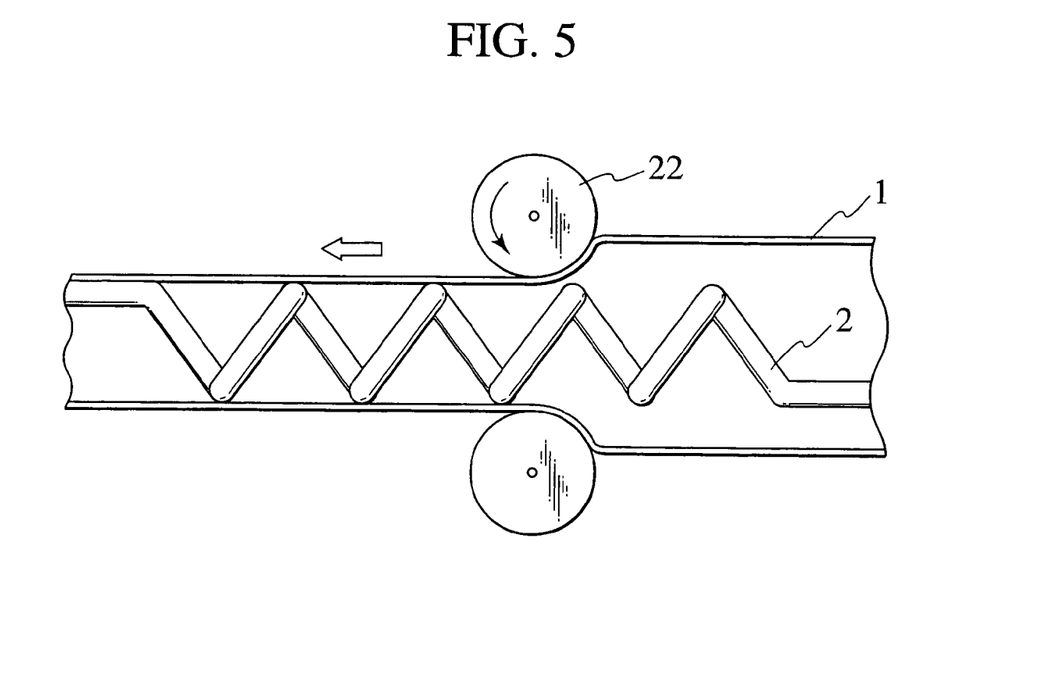
FIG. 5 is a view showing a state to draw an outer pipe with rollers so as to fix the outer pipe to a spiral inner pipe inserted in the outer pipe according to an alteration of the first embodiment.

In FIG. 5, the outer pipe 1 is drawn to reduce the diameter thereof, so that the outer pipe 1 and inner pipe 2 are pressed against each other at the reduced part. More precisely, the outer pipe 1 is drawn with rollers 22.

Figure 6:
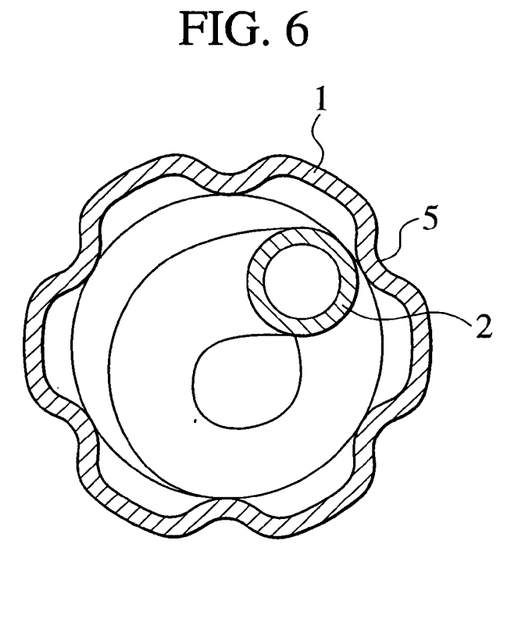
FIG. 6 is a sectional view showing an outer pipe whose wall has been crushed at several locations along the circumference thereof, to fix the outer pipe to a spiral inner pipe inserted in the outer pipe according to an alteration of the first embodiment.

In FIG. 6, the wall of the outer pipe 1 is crushed by a tool at a plurality of circumferential locations, to join the outer pipe 1 and inner pipe 2 together at a plurality of inwardly protruding regions. A reference numeral 5 indicates the crushed regions or parts. There are a plurality of crushed parts 5 in the circumferential direction of the outer pipe 1. Such crushing may easily be carried out with the use of crushing or rolling tools.

Fixing the outer pipe 1 to the inner pipe 2 by locally or wholly deforming the outer pipe 1 toward the inner pipe 2 as shown in FIGS. 3 to 6 secures the outer pipe 1 and inner pipe 2 to each other irrespective of whether or not the double pipe 10 is curved later. Namely, the outer pipe 1 and inner pipe 2 are strongly held together along the entire length thereof including straight parts where no bending is conducted. The spiral inner pipe 2 is inserted into the outer pipe 1 with a gap between the two pipes, so that no excessive force is required for the insertion procedure. This makes the manufacturing of the double pipe 10 easier. A method of manufacturing a double pipe according to the second embodiment of the present invention utilizes a force when inserting an inner pipe into an outer pipe.

The method of manufacturing a double pipe according to the second embodiment will be explained.

Figure 7:
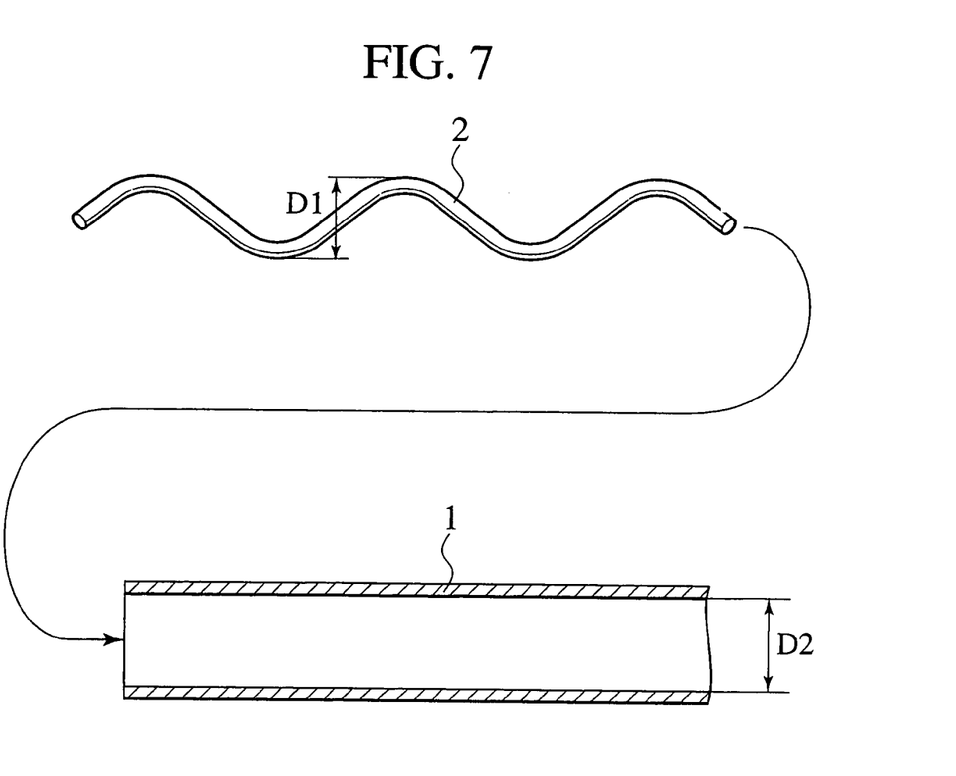
FIG. 7 is a view explaining a method of manufacturing a double pipe according to a second embodiment.

FIG. 7 shows the double pipe manufacturing method according to the second embodiment. When processing an inner pipe 2 into a spiral shape, the second embodiment makes an outer diameter D1 of the spiral of the inner pipe 2 greater than an inner diameter D2 of an outer pipe 1, unlike the first embodiment. After forming the spiral inner pipe 2, the second embodiment inserts the inner pipe 2 into the outer pipe 1 so that the inner pipe 2 is pressed against the inner wall of the outer pipe 1. When inserting the inner pipe 2 into the outer pipe 1, the resiliency of the spiral inner pipe 2 is used to reduce the diameter of the spiral. After the insertion, the reaction force of the resilient spiral of the inner pipe 2 strongly presses the inner pipe 2 against the outer pipe 1. Namely, the difference between the diameters D1 and D2 works as a fitting margin to fix the outer pipe 1 and inner pipe 2 to each other.

Irrespective of whether or not the outer pipe 1 is curved later, the outer pipe 1 and inner pipe 2 are strongly pressed against each other. Namely, the outer pipe 1 and inner pipe 2 are strongly joined together along the entire length thereof including straight parts where no bending is applied. Like the first embodiment, the second embodiment involves no connecting ribs between the outer pipe 1 and the inner pipe 2, to reduce manufacturing cost.

Examples of methods of forming an inner pipe 2 into a spiral shape will be explained with reference to FIGS. 8 to 10.

The method of FIGS. 8A to 8C will be explained. In FIG. 8A, two inner pipes 2 are prepared and are spirally wound around each other. In FIG. 8B, the two wound pipes 2 are released from each other, to provide spiral pipes 2. In FIG. 8C, the spiral pipe 2 is inserted into an outer pipe 1, and the outer pipe 1 and inner pipe 2 are fixed to each other as discussed above.

The method of FIGS. 9A to 9C will be explained. In FIG. 9A, an inner pipe 2 and a columnar core 31 are prepared. In FIG. 9B, the inner pipe 2 is spirally wound around the core 31, and then, the wound inner pipe 2 is released from the core 31 to provide a spiral inner pipe 2. In FIG. 9C, the spiral inner pipe 2 is inserted into an outer pipe 1, and the outer pipe 1 and inner pipe 2 are fixed to each other as discussed above.

Figure 10A:
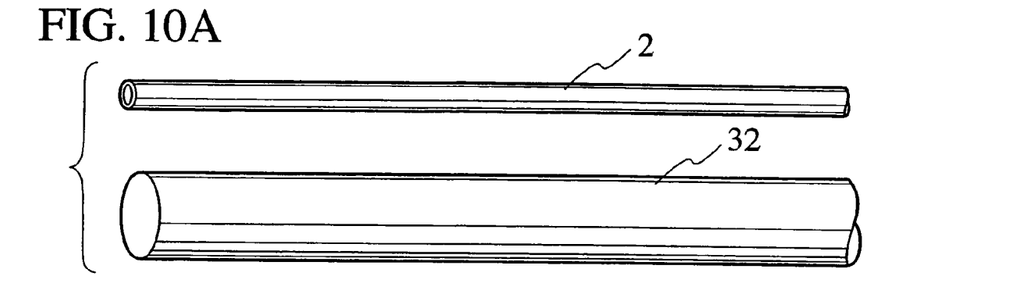
FIGS. 10A, 10B, 10C, and 10D are views explaining a method of manufacturing a spiral inner pipe.
Figure 10B:
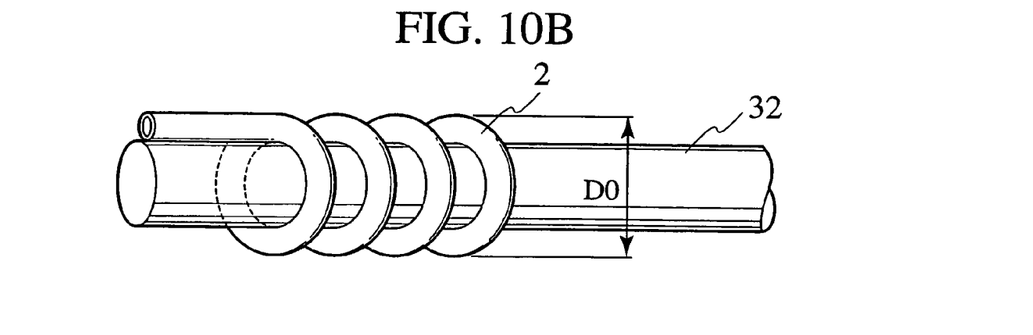
Figure 10C:
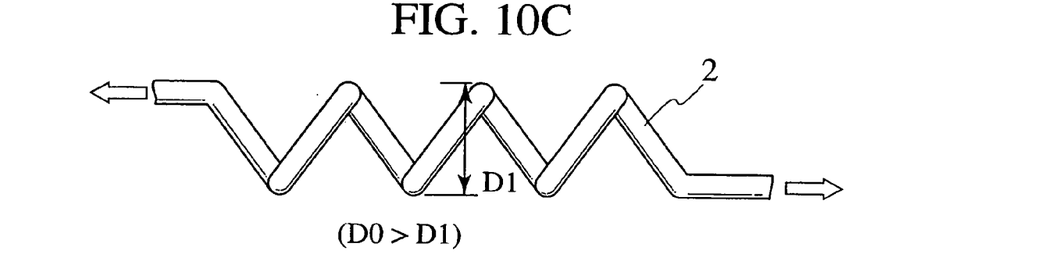
Figure 10D:
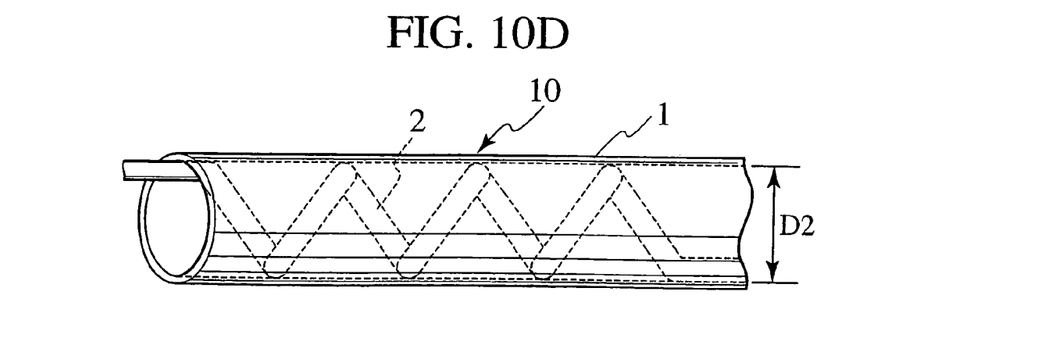

The method of FIGS. 10A to 10D will be explained. In FIG. 10A, an inner pipe 2 and a core 32 are prepared. The core 32 is selected so as to make a spiral of the inner pipe 2 have an outer diameter D0 that is greater than a required spiral diameter D1. In FIG. 10B, the inner pipe 2 is spirally wound around the core 32 at a narrow pitch. The inner pipe 2 is released from the core 32 to provide a spiral inner pipe 2. In FIG. 10C, the spiral inner pipe 2 is extended in an axial direction so that the inner pipe 2 may have the required outer spiral diameter D1. In FIG. 10D, the spiral inner pipe 2 is inserted into the outer pipe 1, and the outer pipe 1 and inner pipe 2 are fixed to each other as mentioned above.

The method of FIGS. 10A to 10D provides the inner pipe 2 with an outer spiral diameter that is greater than the required outer spiral diameter D1 and elongates the spiral inner pipe 2 to the pitch of extend spiral and reduce the outer spiral diameter to the required outer spiral diameter D1. After the inner pipe 2 is inserted into the outer pipe 1, the inner pipe 2 is tightly pressed against the outer pipe 1 due to the springback of the spiral inner pipe 2.

Figure 8A:
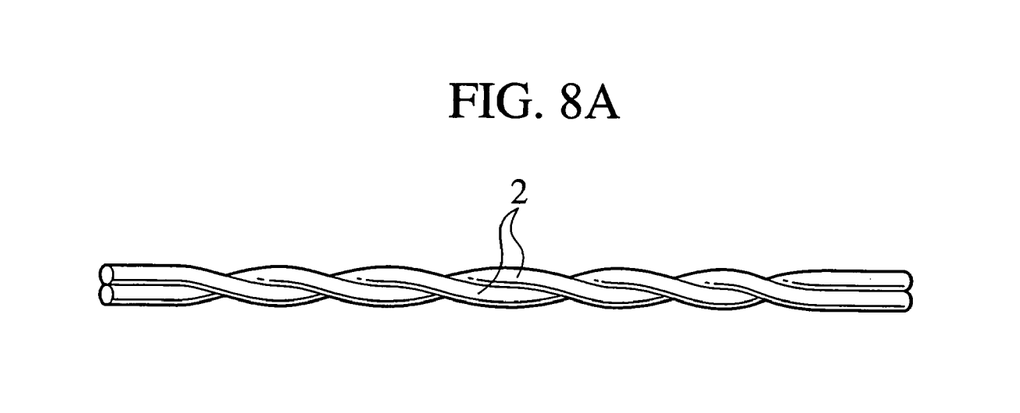
FIG. 8A shows two inner pipes spirally wound around each other.
Figure 8B:
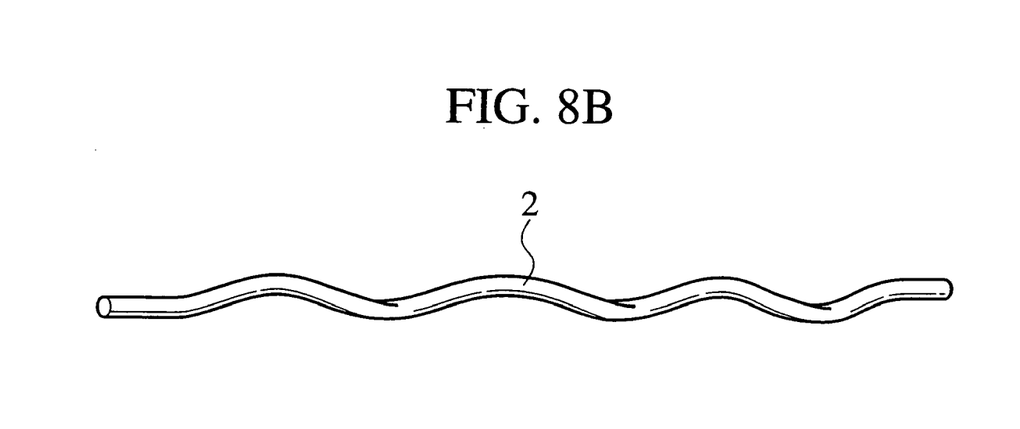
FIG. 8B shows one of the inner pipes released from each other.
Figure 8C:
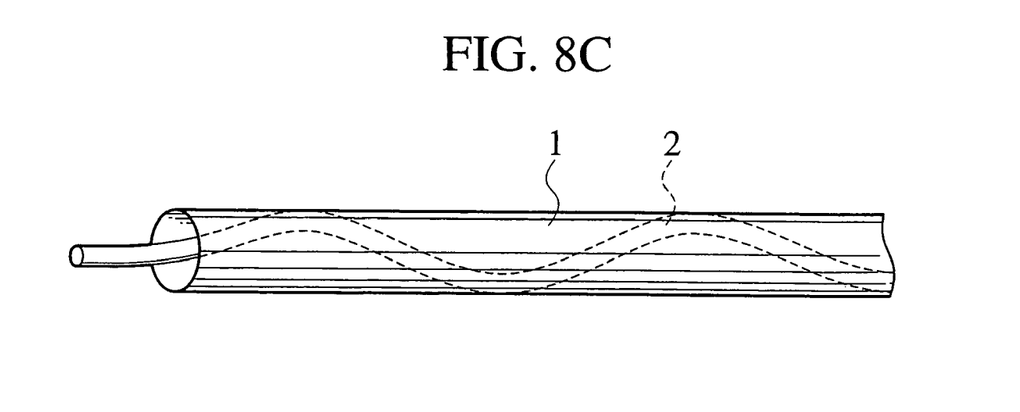
FIG. 8C shows the released inner pipe inserted in an outer pipe.
Figure 9A:
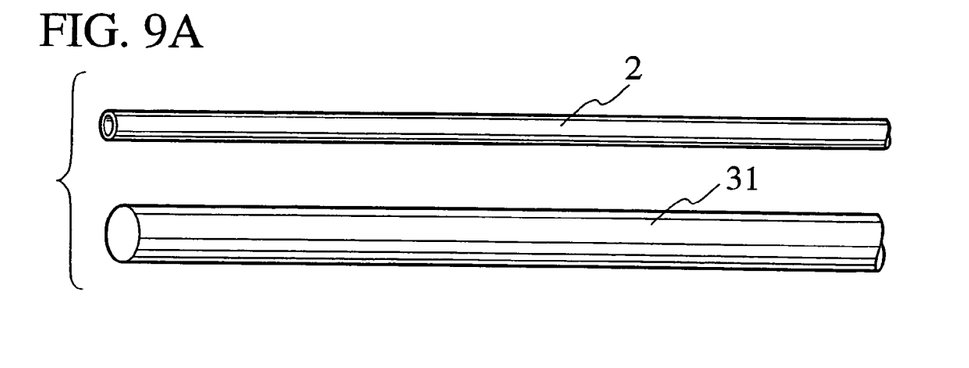
FIGS. 9A, 9B, and 9C are views explaining a method of manufacturing a spiral inner pipe.
Figure 9B:
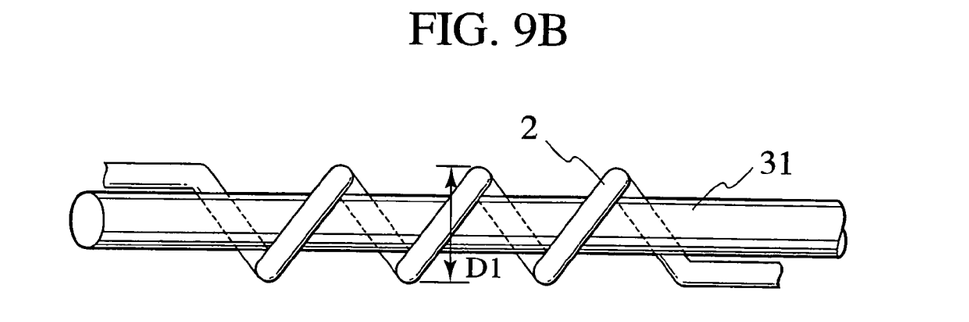
Figure 9C:
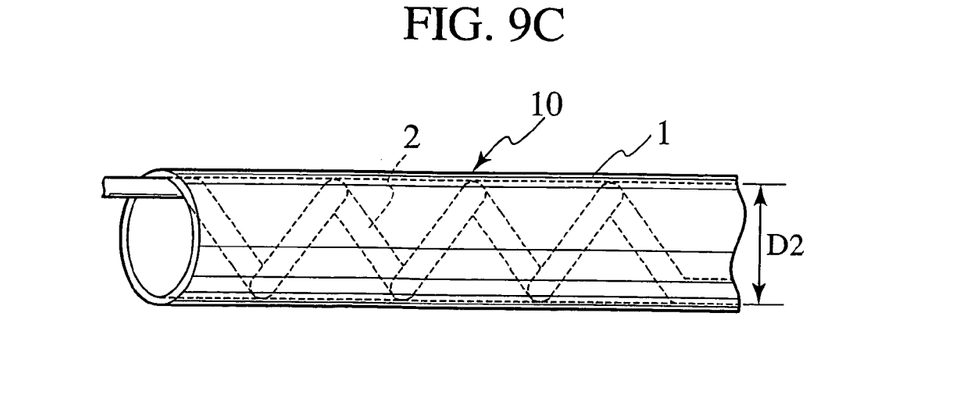
Figure 11:
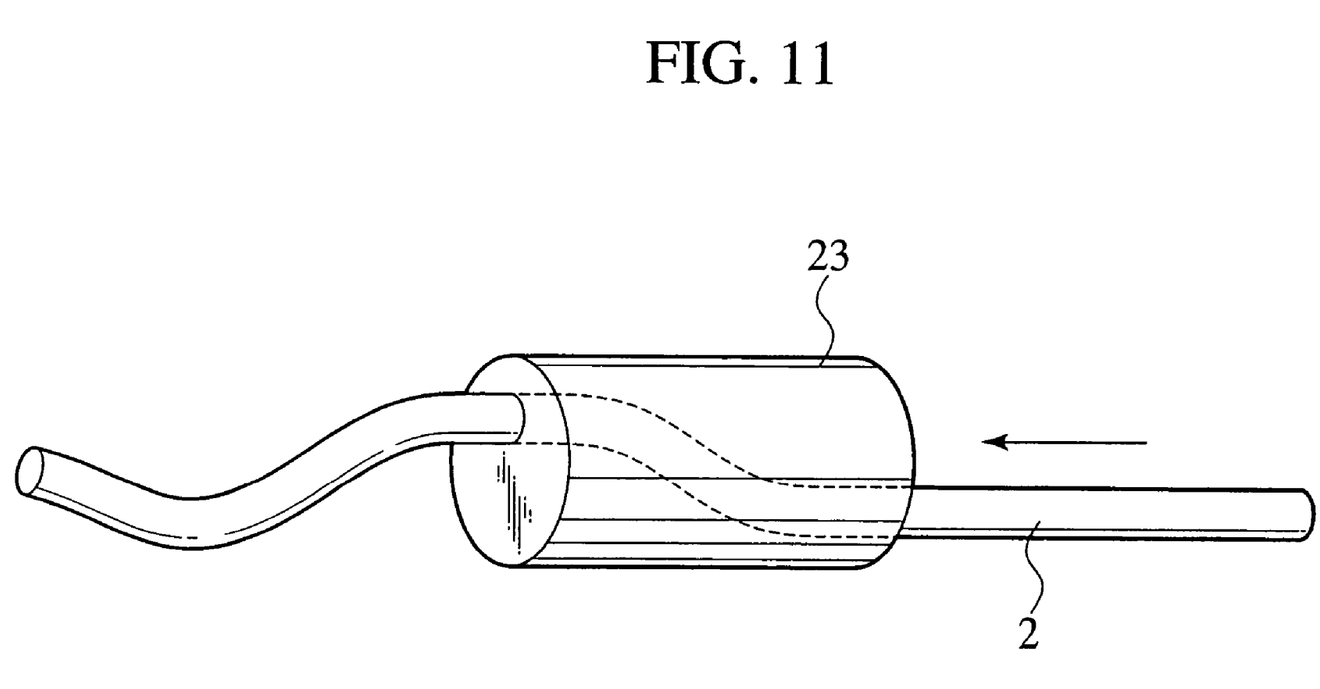
FIG. 11 is a view explaining a method of manufacturing a spiral inner pipe.
Figure 12:
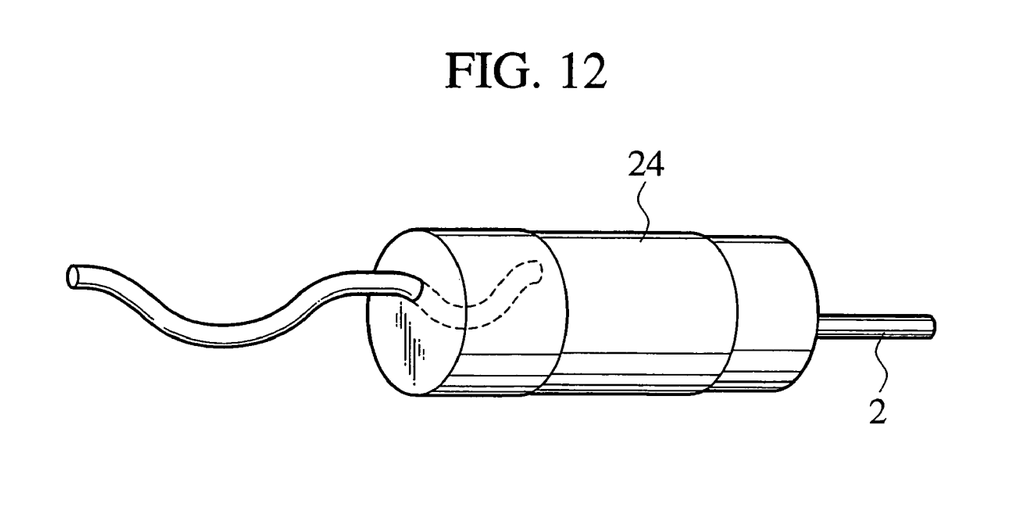
FIG. 12 is a view explaining a method of manufacturing a spiral inner pipe.
Figure 13:
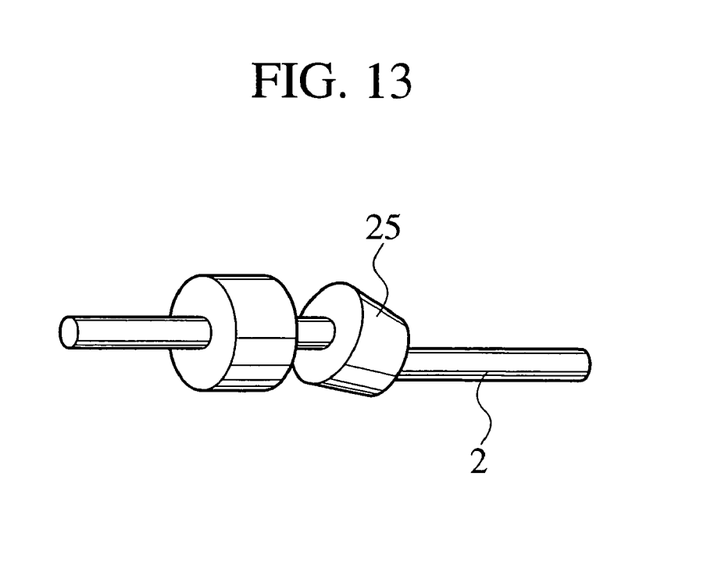
FIG. 13 is a view explaining a method of manufacturing a spiral inner pipe.

The methods shown in FIGS. 8 to 10 can form the spiral inner pipe 2 at low cost without the special metal dies shown in FIGS. 11 to 13.

According to other embodiments of the present invention, an inner pipe 2 is provided with a spiral shape by extruding or drawing the straight inner pipe 2 through an extrusion die 23 as shown in FIG. 11, or through a hot forming die 24 as shown in FIG. 12, or through a monocoque bender 25 as shown in FIG. 13.

A method of manufacturing a double pipe according to the third embodiment of the present invention will be explained with reference to FIGS. 14A to 14C.

Figure 14A:
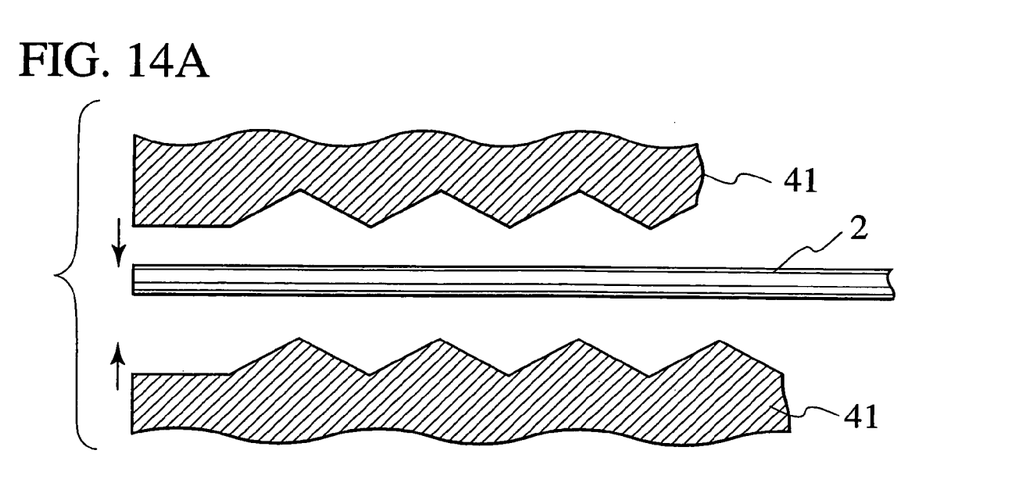
FIG. 14A shows a state before forming an inner pipe into a wavy shape with a press die.
Figure 14B:
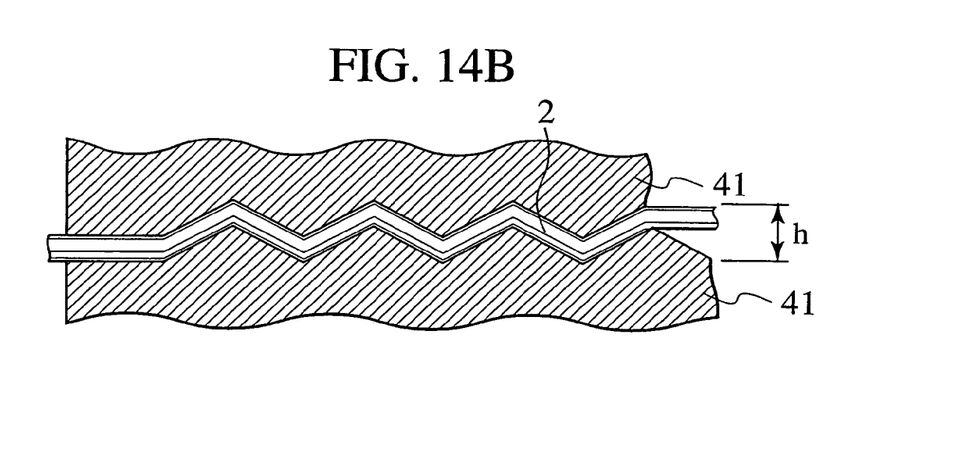
FIG. 14B shows a pressing state of the inner pipe.
Figure 14C:
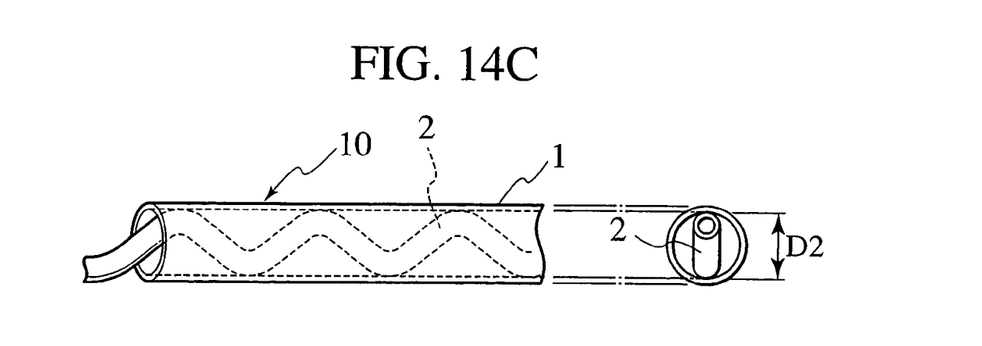
FIG. 14C shows the wavy inner pipe inserted in an outer pipe.

In FIGS. 14A and 14B, a wavy inner pipe 2 is formed with a press die 41. In FIG. 14C, the inner pipe 2 is inserted into an outer pipe 1, and the inner pipe 2 is pressed against an inner wall of the outer pipe 1. Pressing the inner pipe 2 against the outer pipe 1 is achieved by setting an amplitude (wave height) H of the wavy inner pipe 2 in the manner of any one of the first and second embodiments. For example, the amplitude H of the inner pipe 2 may be equal to or smaller than an inner diameter D2 of the outer pipe 1 like the first embodiment. Alternatively, the amplitude H of the inner pipe 2 may be greater than the inner diameter D2 of the outer pipe 1, like the second embodiment. The details of the first and second embodiments have already been explained, and therefore, are not repeated. Providing the inner pipe 2 with a wavy shape may be achieved in any manner other than the pressing of FIGS. 14A and 14B.

The third embodiment provides the same effects as the first and second embodiments.

As explained above, any one of the embodiments of the present invention manufactures a double pipe by inserting a spiral or wavy inner pipe into an outer pipe and pressing the inner pipe and outer pipe against each other without arranging connecting ribs between the inner pipe and the outer pipe. Accordingly, any one of the embodiments needs no complicated extrusion dies when manufacturing the double pipe and simplifies a termination of the double pipe, to thereby reduce the manufacturing cost of the double pipe.

The double pipe according to any one of the embodiments has another advantage.

As a comparison example, a technique is considered that simply inserts an inner pipe into an outer pipe and fixes ends of the inner pipe to the ends of the outer pipe to form a double pipe. This comparison example involves a possibility that one of the outer and inner pipes strongly vibrates due to the vibration of a vehicle in which the double pipe is installed and intermittently comes into contact with the other pipe to produce a chattering noise.

Figure 15:
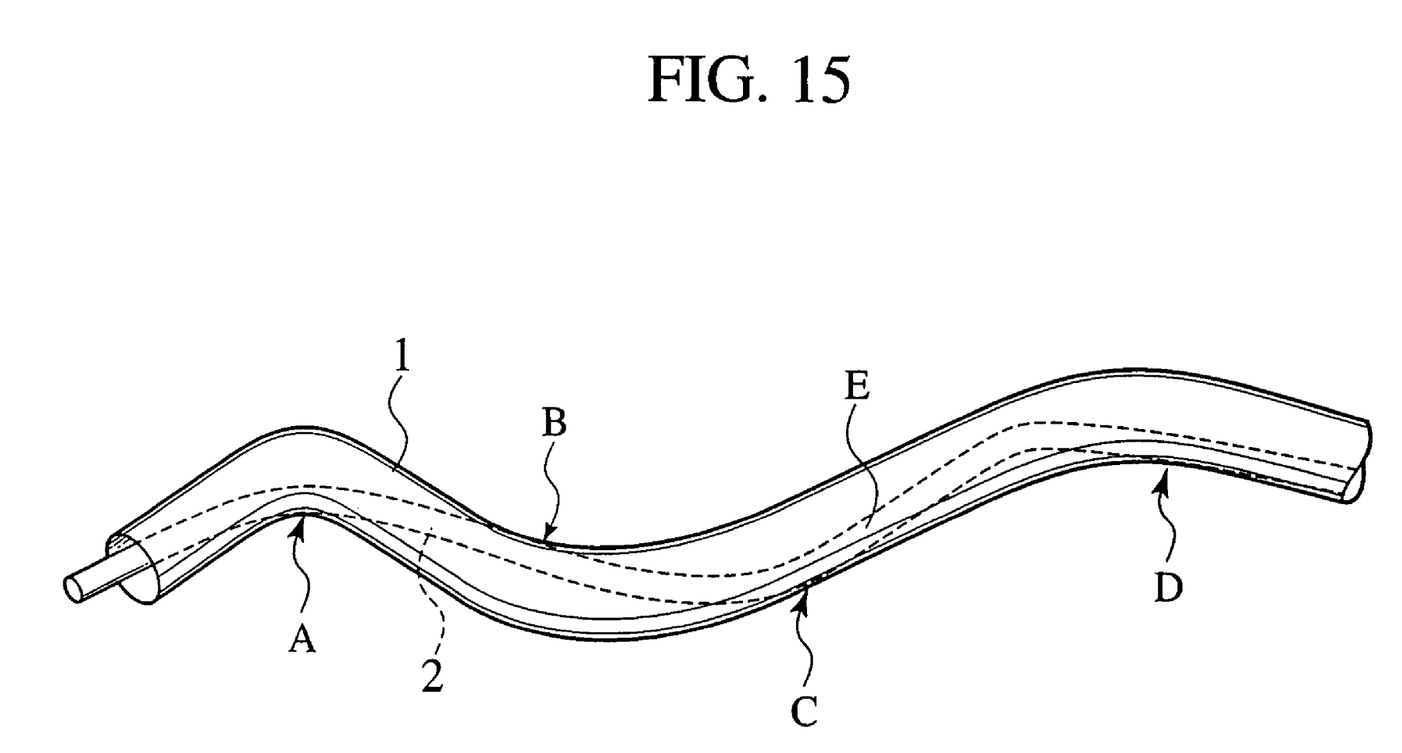
FIG. 15 is a view showing a comparison example to explain a problem that occurs when an inner pipe is simply inserted into an outer pipe.

If the double pipe of the comparison example is bent along a given piping layout as shown in FIG. 15, the outer pipe 1 and inner pipe 2 will form contacts A, B, C, and D. In particular, the loose contacts C and D may produce a chattering noise due to the vibration of the vehicle. In addition, the inner pipe 2 may produce a slack E in the outer pipe 1. The slack E will produce a large chattering noise at the contact C. To avoid the problem, there may be an idea to enlarge the curvature of each bend so that the inner pipe 2 may be strongly pressed against an inner wall of the outer pipe 1. However, such an arrangement restricts the shape of each bend of the double pipe. On the other hand, any one of the embodiments firmly fixes the outer and inner pipes of a double pipe to each other to suppress a chattering noise without restricting the shape of each bend of the double pipe.

In each of the above embodiments, the inner pipe is arranged in a spiral or wavy configuration along the entire length of the pipe. The present invention also allows other arrangements in which the inner pipe is arranged in a spiral or wavy configuration and has partially straight parts.

Although the present invention has been explained in connection with the embodiments, it will be appreciated by those skilled in the art that the present invention is not limited by the embodiments. Without departing from the scope and spirit of the present invention defined in the claims, the present invention may allow many modifications or alterations. Accordingly, the descriptions in this application are only for explanatory purposes and are not intended to limit the present invention.

What is claimed is:

1. A double pipe comprising:
   an outer pipe; and
   an inner pipe having a spiral shape configured to be held by an inner circumferential face of the outer pipe, wherein:
   the diameter of the spiral of the inner pipe is equal to or less than an inner diameter of the outer pipe; and
   the outer pipe has a curved part with a flattened cross-section so that the inner pipe contacts an inner circumferential face of the curved part and is fixedly held by the curved part.

2. A double pipe comprising:
   an outer pipe; and
   an inner pipe having a spiral shape configured to be held by an inner circumferential face of the outer pine, wherein:
   the diameter of the spiral of the inner pipe is equal to or less than an inner diameter of the outer pipe; and
   the outer pipe is locally or wholly crushed inwardly in a diametrical direction to hold the inner pipe at each crushed part.

3. A double pipe comprising:
   an outer pipe; and
   an inner pipe having a wavy shape configured to be held by an inner circumferential face of the outer pipe, wherein:
   an amplitude of the wavy shape of the inner pipe is equal to or less than an inner diameter of the outer pipe; and
   the outer pipe has a curved part with a flattened cross-section so that the inner pipe contacts an inner circumferential face of the curved part and is fixedly held by the curved part.

4. A double pipe comprising:
   an outer pipe; and
   an inner pipe having a wavy shape configured to be held by an inner circumferential face of the outer pipe, wherein:
   an amplitude of the wavy shape of the inner pipe is equal to or less than an inner diameter of the outer pipe; and
   the outer pipe is locally or wholly crushed inwardly in a diametrical direction to hold the inner pipe at each crashed part.

* * * * *